HENRY AUGUST STAINKEN INVENTOR

BY W. L. Hunter ATTORNEY

United States Patent Office 3,265,165
Patented August 9, 1966

3,265,165
BRAKE SHOE MOUNTING
Henry August Stainken, New York, N.Y., assignor to Otis Elevator Company, New York, N.Y., a corporation of New Jersey
Filed July 2, 1964, Ser. No. 379,891
8 Claims. (Cl. 188—166)

This invention relates generally to brakes suitable for use with elevators and particularly to a brake shoe mounting arrangement by which the brake shoe is easily and quickly aligned with the brake drum.

Brakes for stopping and holding a rotating element have been made with both the so-called "solid" shoe and the so-called "swivel" shoe. In the former, the brake shoe is pivoted near one end and is engaged and disengaged from the drum by a force applied in the appropriate direction at a suitable point on the shoe. It has been found that, with reasonable manufacturing tolerances, the shoe seldom fits well enough when initially installed to make all portions of the lining bear equally against the drum. Accordingly, it has been customary to use an eccentrically mounted pivot pin so that the pivot point may be adjusted during installation to fit the circumferential contour of the lining to the contour of the brake drum.

The swivel shoe is pivotally mounted usually near its center, to a brake arm which, in turn, is pivotally mounted near one end to the frame. Forces for applying and releasing the brakes are applied to the brake arm. Because there are two pivot points, the shoe is substantially self-aligning in the circumferential direction upon installation and precise adjustment of the location of the pivot points is unnecessary.

Both solid shoes and swivel shoes have been widely used, the choice depending upon a number of factors. Both solid shoes and swivel shoes are subject to the problem of lateral, or axial, misalignment when the ordinary pivot pin construction is used. This problem is especially severe in large brakes but may be overcome by using universal or ball joint pivots. The solid shoe, because of its fewer number of parts, is less expensive. The swivel shoe is substantially self-aligning in the circumferential direction while considerable time is required to adjust a solid shoe properly. The solid shoe exhibits less tendency to produce noise, both because of the fewer number of relatively moving parts and because it is positively withdrawn from contact with the drum whereas one end of a swivel shoe tends to drag on the drum unless counter-balancing springs or the like are provided. Even so, the swivel shoe usually requires a greater amount of movement of the shoe between full application and full release.

Another factor is wear. In the solid shoe, the pressure distribution is unequal over the surface of the lining, the greatest pressure, and consequently the greatest wear, occurring at the end of the shoe farthest from the pivot point. In the swivel shoe, the pressure and the wear are substantially constant over the entire surface of the lining. Wear may be an important factor in those elevator systems in which the mechanical brake is required to bring the car to a stop whereas wear may be unimportant in those systems wherein the mechanical brake is used only to hold the car after it has been stopped electrically.

It is a general object of the present invention to provide a brake shoe mounting arrangement which combines the advantages of the solid and swivel shoe constructions.

Another object is to provide a brake shoe mounting arrangement which operates substantially as a swivel shoe upon application of the brake and substantially as a solid shoe upon removal of the brake.

Another object is to provide a mounting arrangement which is quiet.

Another object is to provide a mounting arrangement in which the brake may be completely released with but a short stroke.

Briefly stated, the invention comprises an arcuate brake shoe pivoted near one end thereof to one end of a brake arm. The other end of the arm is pivoted to the frame. The other end of the shoe is interconnected with the arm by an adjustable unidirectional connection by which motion of the arm can release but not apply the brake. The force to apply the brake is impressed substantially at the center of the shoe and when so impressed, with the adjustment completely loosened, the shoe adjusts itself by virtue of the two pivot points so that the contour of the lining substantially matches that of the brake drum. The unidirectional connection is then adjusted to take up all, or nearly all, of the slack. The force to release the brake is applied to the brake arm. The brake arm engages both ends of the brake shoe, one end through the pivot and the other end through the unidirectional connection (after a very small amount of travel to take up the slack, if so adjusted). Accordingly, a relatively small amount of movement of the brake arm suffices to release the brake entirely.

For a clearer understanding of the invention reference may be made to the following detailed description and the accompanying drawing, in which.

Figure 1:
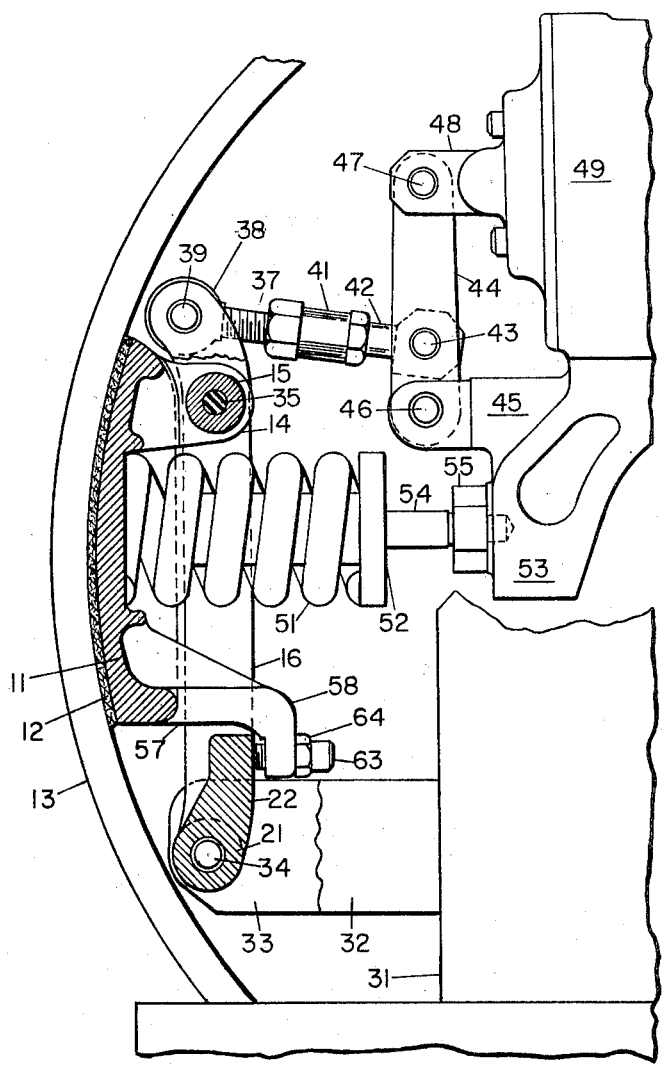
FIGURE 1 is a front elevation view, partly in section, of a brake system incorporating the invention.

Referring first to FIG. 1, there is shown an arcuate brake shoe 11 with a brake lining 12 fastened thereto which cooperates with a brake drum 13. The drum 13 is mounted for rotation on a stationary frame by any suitable means (not shown). The upper end of the brake shoe 11 is formed with a laterally extending member 14 which carries a self-aligning spherical bearing 15 by which it is pivoted to a brake arm 16, as will be more fully explained.

Figure 2:
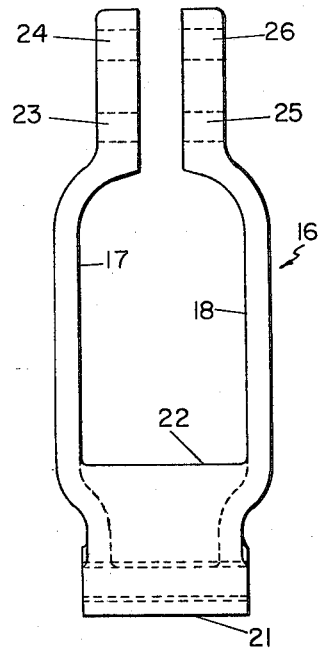
FIGURE 2 is a side elevation view of a brake arm used in the invention.

Referring now to FIG. 2, the brake arm 16 is bifurcated and comprises legs 17 and 18. The legs 17 and 18 are joined at their lower ends by a sleeve portion 21 and a tongue portion 22 which extends between the legs 17 and 18. The upper ends of the legs 17 and 18 approach each other, as shown. The leg 17 has apertures 23 and 24 formed therein which are aligned with similar apertures 25 and 26 formed in the leg 18.

Returning to FIG. 1, the frame, denoted generally by the reference character 31, is formed with two similar spaced apart laterally extending members 32 and 33, one behind the other as viewed in FIG. 1, the member 32 being shown cut away. The lower end of the brake arm 16 is pivoted to the fram by means of a pin 34 which passes through the sleeve portion 21 and through apertures in the members 32 and 33. The previously mentioned spherical bearing 15 in the member 14 is positioned between the upper portions of the legs 17 and 18 (FIG. 2) of the arm 16 and is fastened thereto by a pin 35 the central portion of which passes through the bearing 15 and opposite ends of which pass through the apertures 23 and 25. Thus the brake shoe 11 is pivoted to the arm 16 about an axis which is approximately parallel to the axis of the brake drum 13 (perpendicular to the paper as viewed in FIG. 1), but, by virtue of the spherical bearing 15, this axis may be tilted a few degrees in any direction.

A short rod or link 37 carries a self-aligning spherical bearing 38 through which a pin 39 passes. Opposite ends of the pin 39 are seated in the apertures 24 and 26 (FIG. 2) of the brake arm 16. The link 37 is connected by a length adjusting device 41, such as a turnbuckle, to a rod 42 which, in turn, is pivoted by a pin 43 to an intermediate portion of a lever 44. The lever 44 is pivoted near its lower end to a frame portion 45 by means of a pin 46 while the upper end is pivoted by a pin 47 to an actuating arm 48 connected to the core of an electromagnet 49. It is apparent that energization of the electromagnet 49 will, through the linkage above described, withdraw the shoe 11 from the brake drum 13.

Figure 3:
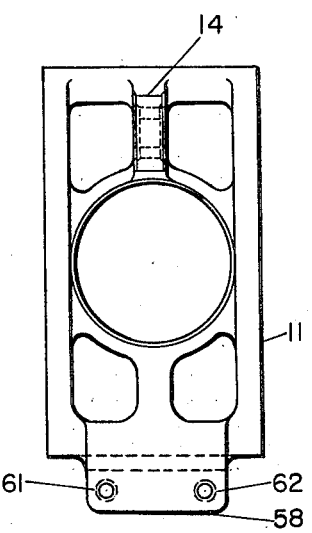
FIGURE 3 is a side elevation view of a brake shoe used in the invention.

The brake is applied by a compression spring 51 one end of which bears against a spring seat 52 fastened to a portion 53 of the frame by a bolt 54 and lock nut 55. The spring 51 passes between the legs 17 and 18 of the arm 16 and bears directly against the brake shoe 11. The lower end of the shoe 11 is formed with a laterally extending member 57 which extends between the legs 17 and 18 and which includes a flange portion 58. As best shown in FIG. 3, the flange portion 58 is formed with two threaded apertures 61 and 62. When assembled, a bolt is threaded through each aperture and one of these, the bolt 63, is shown in FIG. 1, extending toward the surface of the tongue portion 22 of the brake arm 16. Each bolt may be adjusted to a desired position and held in place by a lock nut, one of which, the nut 64, is shown in FIG. 1. The ends of the bolts and the facing surface of the tongue portion 22, constitute cooperating juxtaposed surfaces the distance between which is adjustable. The mechanism may be regarded as a unidirectional connection or clamp because the shoe 11 can rotate without hindrance counterclockwise about the pin 35 or, stated another way, the arm 16 can rotate counterclockwise about the pin 34 without hindrance while rotation of either element in the opposite (clockwise) direction causes the parts to engage and move as a unit around pivot pin 34. Under some circumstances, as will be more fully explained, the bolt 63 (and its twin) may be adjusted to provide a small amount of clearance between its end and the surface of the tongue portion 22, in which case, the mechanism acts as a lost motion device. Clockwise motion of the brake arm 16 about the pin 34 at first causes no motion of the flange 58 but when the clearance is taken up, the flange 58 is constrained to move with the arm 16.

When the apparatus is installed, the bolt 63 and its twin are backed off to provide a large amount of clearance between the bolts and the tongue portion 22. The electromagnet 49 is deenergized to free the upper end of the arm 16. The spring 51 urges the lining 12 against the drum 13. The self-aligning action of the bearing 15 allows the pivot axis to tilt sufficiently to conform the contour of the lining 12 to that of the drum 13 in the axial direction. The two pivot points, namely, that of the shoe to the arm at pin 35 and the arm to the frame at pin 34, allow the shoe 11 to be shifted circumferentially by the spring 51 sufficiently to conform the contour of the lining 12 to that of the drum 13 in the circumferential direction. Thus, during installation, the assembly acts as a swivel shoe brake and is self-aligning. The pivot points need not be located with great precision during manufacture because their location is not critical.

After the shoe has aligned itself as above explained, the bolt 63 and its twin are adjusted. In most cases it is preferred to adjust the bolts so that their ends just touch the surface of the tongue portion 22 and to lock them in this position. The turnbuckle 41 is next adjusted to position the actuating arm 48 and the core of the electromagnet 49 for best operation. Energization of the electromagnet 49 causes both ends of the arm 16 to pull both ends of the shoe 11 and lining 12 out of contact with the drum 13. The assembly acts as a solid shoe brake and a short stroke is sufficient to release the brake completely.

In some cases it may be preferred to adjust the bolt 63 and its twin to provide a small amount of clearance between their ends and the surface of the tongue portion 22.

Such adjustment allows the shoe 11 to pivot about the pin 35 and allows the arm to pivot about the pin 34 whenever the brake is applied by deenergization of the electromagnet 49. Thus the assembly acts as a swivel shoe brake and is free to align itself each time the brake is applied. When the brake is released by energization of the electromagnet 49, the upper end of the shoe 11 is withdrawn at once but the lower end is not withdrawn until the arm 16 has been rotated sufficiently to take up the lost motion between the tongue portion 22 and the ends of the bolt 63 and its twin. However, the slack or clearance can be made quite small without impairing the swivel shoe action on application so that only a small increase in the stroke of the electromagnet is required to release the brake completely.

Although a preferred embodiment of the invention has been described in considerable detail for illustrative purposes, many modifications will occur to those skilled in the art. It is therefore desired that the protection afforded by Letters Patent be limited only by the true scope of the appended claims.

What is claimed is:
1. A brake, comprising,
 a brake drum,
 a pivoted brake arm,
 a brake shoe pivotally mounted on said arm,
 means acting independently of said arm for impressing a brake applying force directly against said shoe substantially at the center thereof, and
 means interconnecting said shoe and said arm for engaging said shoe upon rotation of said arm in one direction and for releasing said shoe upon rotation of said arm in the opposite direction.

2. A brake, comprising,
 a brake drum,
 a pivoted brake arm,
 a brake shoe pivotally mounted on said arm,
 means acting independently of said arm for impressing a brake applying force directly against said shoe substantially at the center thereof,
 means for impressing a brake releasing force on said arm, and
 means interconnecting said shoe and said arm for engaging said shoe and withdrawing it from said drum upon application of said brake releasing force and for releasing said shoe from said arm upon removal of said brake releasing force.

3. An internal brake, comprising,
 a frame,
 a brake drum including a concave cylindrical operating surface rotatably mounted on said frame,
 a brake arm pivotally mounted on said frame,
 an arcuate brake shoe including a lining having a convex cylindrical surface fastened thereto for engaging said brake drum,
 said shoe being pivotally mounted on said arm,
 means acting independently of said arm for impressing a brake applying force directly against said shoe substantially at the center thereof,
 means for impressing a brake releasing force on said arm, and
 adjustable means interconnecting said shoe and said arm for engaging said shoe and withdrawing it from said drum upon application of said brake releasing force and for releasing said shoe from said arm upon removal of said brake releasing force.

4. A brake, comprising,
 a frame,
 a brake drum rotatably mounted on said frame,
 a brake arm pivoted near one end thereof to said frame,
 an arcuatae brake shoe including a lining fastened thereto for engaging said brake drum,
 said shoe being pivoted near one end thereof to said brake arm, means for impressing a force against said shoe substantially at the center thereof for urging said lining into contact with said drum, and a pair of cooperating juxtaposed surfaces fastened to the other end of said shoe and to said arm respectively for engagement with each other when said arm is moved about its pivot in a direction away from said shoe, whereby such movement draws both ends of said shoe away from said drum and disengages said lining from said drum.

5. A brake comprising, a frame, a brake drum rotatably mounted on said frame, a brake arm pivoted near one end thereof to said frame, an arcuate brake shoe including a lining fastened thereto for engaging said brake drum, said shoe being pivoted near one end thereof to said brake arm, means for impressing a brake applying force against said shoe substantially at the center thereof for urging said lining into contact with said drum, and first and second members fastened to the other end of said shoe and to said arm respectively, said members being formed with cooperating juxtaposed surfaces spaced from each other when the brake is fully applied and arranged for engagement with each other when said arm is moved about its pivot in a direction away from said shoe, whereby such movement draws both ends of said shoe away from said drum and disengages said lining from said drum.

6. A brake, comprising, a frame, a brake drum rotatably mounted on said frame, a brake arm pivoted near one end thereof to said frame, an arcuate brake shoe including a lining fastened thereto for engaging said brake drum, said shoe being pivoted near one end thereof to said brake arm, means for applying a force against said shoe substantially at the center thereof for urging said lining into engagement with said drum, said shoe and said arm being formed with a pair of surfaces positioned in juxtaposed relationship for engagement with each other when said arm is moved about its pivot in a direction away from said shoe, whereby such movement disengages said lining from said drum, and means for adjusting the spacing between said surfaces.

7. A brake, comprising, a frame, a brake drum rotatably mounted on said frame, a brake arm pivotally mounted to said frame, a brake shoe having a lining and pivoted near one end thereof to said brake arm, a compression spring opposite ends of which bear against a portion of said frame and the center of said shoe for applying the brake by urging said lining into engagement with said drum, means for applying a brake releasing force to said arm to move said arm about its pivot in a direction away from said shoe, and an adjustable lost motion connection means between the other end of said shoe and said arm for withdrawing said lining from said drum after said force has moved said arm a predetermined distance.

8. A brake, comprising, a stationary frame, a brake drum rotatably mounted on said frame, a brake arm having first and second ends pivotally mounted near said first end to said frame, an arcuate brake shoe having first and second ends and including a lining fastened thereto for engaging said brake drum, said brake shoe being pivoted near said first end thereof to said arm near said second end thereof, a compression spring acting between said frame and the center of said brake shoe independently of said arm for urging said lining into engagement with said drum to apply the brake, means for applying a brake releasing force to said brake arm near said second end thereof to move said arm about its pivot in a direction away from said shoe, first and second members fastened respectively near said second end of said brake shoe and said first end of said brake arm, said members being formed with opposed surfaces which approach each other as said brake releasing force is applied, one of said members having formed therein a threaded aperture extending through one of said surfaces, and a bolt threaded through said aperture with its end directed toward the other of said surfaces, whereby the effective spacing between said members may be adjusted.

References Cited by the Examiner

UNITED STATES PATENTS 1,772,867   8/1930   Jones _____ 188—171
2,554,330   5/1951   Hodgson _____ 188—171 X DUANE A. REGER, *Primary Examiner.*